US008867310B1

(12) United States Patent
Ray et al.

(10) Patent No.: US 8,867,310 B1
(45) Date of Patent: *Oct. 21, 2014

(54) METHOD AND SYSTEM FOR TRANSMISSION OF SEISMIC DATA

(71) Applicant: Fairfield Industries, Inc., Sugar Land, TX (US)

(72) Inventors: Clifford H. Ray, Fulshear, TX (US); Glenn D. Fisseler, Houston, TX (US)

(73) Assignee: Fairfield Industries, Inc., Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/258,654

(22) Filed: Apr. 22, 2014

Related U.S. Application Data

(60) Continuation of application No. 14/100,940, filed on Dec. 9, 2013, which is a division of application No. 13/569,990, filed on Aug. 8, 2012, now Pat. No. 8,644,111, which is a continuation of application No. 13/532,426, filed on Jun. 25, 2012, now abandoned, which is a continuation of application No. 13/035,665, filed on Feb. 25, 2011, now Pat. No. 8,296,068, which is a continuation of application No. 11/438,168, filed on May 22, 2006, now Pat. No. 7,983,847, which is a division of application No. 10/719,800, filed on Nov. 21, 2003, now Pat. No. 7,124,028.

(51) Int. Cl.
*G01V 1/00* (2006.01)
*G01V 1/22* (2006.01)

(52) U.S. Cl.
CPC ........................................ *G01V 1/22* (2013.01)
USPC .......................................................... 367/77

(58) Field of Classification Search
USPC .......................................................... 367/77
See application file for complete search history.

(56) References Cited

U.S. PATENT DOCUMENTS

| 1,706,066 A | 3/1929 | Karcher |
| 3,886,494 A | 5/1975 | Kostelnicek et al. |

(Continued)

FOREIGN PATENT DOCUMENTS

| AU | 2004202911 | 7/2004 |
| EP | 1 622 305 A1 | 2/2006 |

(Continued)

OTHER PUBLICATIONS

Canadian Office Action dated May 27, 2013 issued in connection with Canadian Application No. 2,547,062, 3 pages.

(Continued)

*Primary Examiner* — Isam Alsomiri
*Assistant Examiner* — James Hulka
(74) *Attorney, Agent, or Firm* — Foley & Lardner LLP

(57) ABSTRACT

The transmission method utilizes multiple seismic acquisition units within an array as intermediate short range radio receivers/transmitters to pass collected seismic data in relay fashion back to a control station. Any one seismic unit in the array is capable of transmitting radio signals to several other seismic units positioned within radio range of the transmitting unit, thus allowing the system to select an optimal transmission path. Utilizing an array of seismic units permits transmission routes back to a control station to be varied as needed. In transmissions from the most remote seismic unit to the control station, each unit within a string receives seismic data from other units and transmits the received seismic data along with the receiving unit's locally stored seismic data. Preferably, as a transmission is passed along a chain, it is bounced between seismic units so as to be relayed by each unit in the array.

30 Claims, 2 Drawing Sheets

(56) References Cited

U.S. PATENT DOCUMENTS

| | | |
|---|---|---|
| 4,042,905 A | 8/1977 | Fort et al. |
| 4,042,906 A | 8/1977 | Ezell |
| 4,072,923 A | 2/1978 | Siems et al. |
| 4,583,206 A | 4/1986 | Rialan et al. |
| 4,663,744 A | 5/1987 | Russell et al. |
| 4,666,338 A | 5/1987 | Schoepf |
| 4,815,044 A | 3/1989 | Deconinck et al. |
| 4,823,326 A | 4/1989 | Ward |
| 4,885,724 A | 12/1989 | Read et al. |
| 4,908,803 A | 3/1990 | Rialan |
| 4,914,636 A | 4/1990 | Garrotta |
| 4,979,152 A | 12/1990 | Rialan et al. |
| 4,992,787 A | 2/1991 | Helm |
| 5,124,956 A | 6/1992 | Rice et al. |
| 5,253,223 A | 10/1993 | Svenning et al. |
| 5,327,399 A | 7/1994 | Asada et al. |
| 5,412,623 A | 5/1995 | Asada et al. |
| 5,550,787 A | 8/1996 | Rialan et al. |
| 5,623,455 A | 4/1997 | Norris |
| 5,706,250 A | 1/1998 | Rialan et al. |
| 5,712,828 A | 1/1998 | Luscombe et al. |
| 5,724,241 A | 3/1998 | Wood et al. |
| 5,822,273 A | 10/1998 | Bary et al. |
| 5,827,273 A | 10/1998 | Edwards |
| 5,910,763 A | 6/1999 | Flanagan |
| 6,002,640 A | 12/1999 | Harmon |
| 6,070,129 A | 5/2000 | Grouffal et al. |
| 6,078,283 A | 6/2000 | Bednar |
| 6,169,476 B1 | 1/2001 | Flanagan |
| 6,208,247 B1 | 3/2001 | Agre et al. |
| 6,219,620 B1 | 4/2001 | Park et al. |
| 6,226,601 B1 | 5/2001 | Longaker |
| 6,229,486 B1 | 5/2001 | Krile |
| 6,285,955 B1 | 9/2001 | Goldwasser |
| 6,353,577 B1 | 3/2002 | Orban et al. |
| 6,443,228 B1 | 9/2002 | Aronstam et al. |
| 6,549,834 B2 | 4/2003 | McClellan et al. |
| 6,832,251 B1 | 12/2004 | Gelvin et al. |
| 6,859,831 B1 | 2/2005 | Gelvin et al. |
| 6,883,638 B1 | 4/2005 | Maxwell et al. |
| 6,999,377 B2 | 2/2006 | Burkholder et al. |
| 7,085,196 B2 | 8/2006 | Nemeth |
| 7,124,028 B2 | 10/2006 | Ray et al. |
| 7,218,890 B1 | 5/2007 | Iseli et al. |
| 7,254,093 B2 | 8/2007 | Ray et al. |
| 7,269,095 B2 | 9/2007 | Chamberlain et al. |
| 7,274,907 B1 | 9/2007 | Perotti et al. |
| 7,298,671 B2 | 11/2007 | Brinkmann et al. |
| 7,310,287 B2 | 12/2007 | Ray et al. |
| 7,453,768 B2 | 11/2008 | Hall et al. |
| 7,489,932 B2 | 2/2009 | Chari et al. |
| 7,505,735 B2 | 3/2009 | Miyoshi |
| 7,535,795 B2 | 5/2009 | Varsamis et al. |
| 7,573,782 B2 | 8/2009 | Barakat |
| 7,630,332 B1 | 12/2009 | Elliott |
| 7,773,457 B2 | 8/2010 | Crice et al. |
| 7,891,004 B1 | 2/2011 | Gelvin et al. |
| 7,920,507 B2 | 4/2011 | Elliott |
| 7,983,847 B2 | 7/2011 | Ray et al. |
| 8,027,225 B2 | 9/2011 | Kamata et al. |
| 8,199,611 B2 | 6/2012 | Goujon |
| 8,217,803 B2 | 7/2012 | El-Hamamsy et al. |
| 8,228,757 B2 | 7/2012 | Beffa et al. |
| 8,238,197 B2 | 8/2012 | Crice et al. |
| 8,238,198 B2 | 8/2012 | Crice |
| 8,238,199 B2 | 8/2012 | Elder et al. |
| 8,296,068 B2 | 10/2012 | Ray et al. |
| 8,335,128 B2 | 12/2012 | Iseli |
| 8,364,127 B2 | 1/2013 | Roy et al. |
| 8,407,008 B2 | 3/2013 | Pavel et al. |
| 8,605,545 B2 | 12/2013 | Crice et al. |
| 8,614,928 B2 | 12/2013 | Kooper et al. |
| 8,618,934 B2 | 12/2013 | Belov et al. |
| 8,644,111 B2 | 2/2014 | Ray et al. |
| 8,681,584 B2 * | 3/2014 | Ray .................. 367/77 |
| 2003/0063585 A1 | 4/2003 | Younis et al. |
| 2003/0128627 A1 | 7/2003 | Iseli et al. |
| 2003/0174582 A1 | 9/2003 | Scott |
| 2004/0121786 A1 | 6/2004 | Radcliffe et al. |
| 2004/0252585 A1 | 12/2004 | Smith et al. |
| 2005/0114033 A1 | 5/2005 | Ray et al. |
| 2005/0122231 A1 | 6/2005 | Varaiya et al. |
| 2005/0141562 A1 | 6/2005 | Chen et al. |
| 2005/0238058 A1 | 10/2005 | Peirce et al. |
| 2005/0271006 A1 | 12/2005 | Chari et al. |
| 2005/0276162 A1 | 12/2005 | Brinkmann et al. |
| 2006/0044940 A1 | 3/2006 | Hall et al. |
| 2006/0212226 A1 | 9/2006 | Ray et al. |
| 2006/0239301 A1 | 10/2006 | Drange |
| 2006/0291327 A1 | 12/2006 | Barakat |
| 2007/0030345 A1 | 2/2007 | Amling et al. |
| 2008/0049550 A1 | 2/2008 | Fleure et al. |
| 2008/0049554 A1 | 2/2008 | Crice et al. |
| 2008/0062815 A1 | 3/2008 | Iseli |
| 2009/0103394 A1 | 4/2009 | Ronnow |
| 2009/0154289 A1 | 6/2009 | Johansen |
| 2009/0184841 A1 | 7/2009 | Gardiner |
| 2010/0008185 A1 | 1/2010 | Moldoveanu |
| 2010/0195439 A1 | 8/2010 | Muyzert |
| 2010/0214871 A1 | 8/2010 | Souders et al. |
| 2010/0305895 A1 | 12/2010 | Drange |
| 2010/0318299 A1 | 12/2010 | Golparian et al. |
| 2011/0012728 A1 | 1/2011 | Mccane et al. |
| 2011/0096628 A1 | 4/2011 | Golparian |
| 2011/0110193 A1 | 5/2011 | Elder et al. |
| 2011/0149686 A1 | 6/2011 | Ray et al. |
| 2011/0242933 A1 | 10/2011 | Maissant et al. |
| 2012/0039329 A1 | 2/2012 | Sun et al. |
| 2012/0275269 A1 | 11/2012 | Ray |
| 2012/0300586 A1 | 11/2012 | Ray et al. |

FOREIGN PATENT DOCUMENTS

| | | |
|---|---|---|
| GB | 2 434 718 A | 8/2007 |
| KR | 20020059876 A | 7/2002 |
| KR | 20020094418 A | 12/2002 |
| RU | 959211 A1 | 9/1982 |
| RU | 2091820 C1 | 9/1997 |
| RU | 2207593 | 6/2003 |
| WO | WO-01/26068 | 4/2001 |
| WO | WO-2005/057237 A2 | 6/2005 |
| WO | WO-2008/033969 | 3/2008 |

OTHER PUBLICATIONS

Final Office Action dated Apr. 1, 2013 in corresponding U.S. Appl. No. 13/296,329, filed Nov. 15, 2011, 14 pages.

Final Office Action dated Feb. 5, 2008 in corresponding U.S. Appl. No. 11/438,168, filed May 22, 2006, 12 pages.

Final Office Action dated Jul. 22, 2010 in corresponding U.S. Appl. No. 11/438,168, filed May 22, 2006, 8 pages.

Final Office Action dated Nov. 22, 2005 in corresponding U.S. Appl. No. 10/719,800, filed Nov. 21, 2003, 4 pages.

International Preliminary Report on Patentability for Application No. PCT/US04/027049 dated Feb. 22, 2006, 6 pages.

International Preliminary Report on Patentability for Application No. PCT/US04/030871 dated May 22, 2006, 4 pages.

International Preliminary Report on Patentability for Application No. PCT/US2010/027049 dated Sep. 13, 2011, 9 pages.

International Search Report for Application No. PCT/US04/027049 dated Apr. 11, 2005, 1 page.

International Search Report for Application No. PCT/US04/30871 dated Aug. 8, 2005, 1 page.

International Search Report for Application No. PCT/US2010/027049 dated Mar. 24, 2011, 5 pages.

Lindsey et al., "Data Gathering Algorithims in Sensor Networks Using Energy Metrics", IEEE Transactions on Parallel and Distributed Systems, vol. 13, No. 9, Sep. 2002, pp. 924-935.

Non-Final Office Action dated Apr. 15, 2005 in corresponding U.S. Appl. No. 10/719,800, filed Nov. 21, 2003, 5 pages.

Non-Final Office Action dated Apr. 2, 2009 in corresponding U.S. Appl. No. 11/438,168, filed May 22, 2006, 12 pages.

(56) References Cited

OTHER PUBLICATIONS

Non-Final Office Action dated Aug. 15, 2008 in corresponding U.S. Appl. No. 11/438,168, filed May 22, 2006, 14 pages.
Non-Final Office Action dated Dec. 12, 2011 in corresponding U.S. Appl. No. 12/381,606, filed Mar. 13, 2009, 9 pages.
Non-Final Office Action dated Jul. 10, 2013 in corresponding U.S. Appl. No. 13/531,187, filed Jun. 22, 2012, 7 pages.
Non-Final Office Action dated Jul. 19, 2013 in corresponding U.S. Appl. No. 13/296,329 dated Jul. 19, 2013, 8 pages.
Non-Final Office Action dated Jul. 5, 2007 in corresponding U.S. Appl. No. 11/438,168, filed May 22, 2006, 11 pages.
Non-Final Office Action dated Jun. 20, 2005 in corresponding U.S. Appl. No. 10/719,800, filed Nov. 21, 2003, 9 pages.
Non-Final Office Action dated May 3, 2012 in corresponding U.S. Appl. No. 13/296,329, filed Nov. 15, 2011, 8 pages.
Non-Final Office Action dated Nov. 15, 2012 in corresponding U.S. Appl. No. 13/569,990, filed Aug. 8, 2012, 6 pages.
Non-Final Office Action dated Nov. 30, 2009 in corresponding U.S. Appl. No. 11/438,168, filed May 22, 2006, 5 pages.
Non-Final Office Action dated Oct. 22, 2012 in corresponding U.S. Appl. No. 13/531,187, filed Jun. 22, 2012, 11 pages.
Non-Final Office Action dated Oct. 24, 2011 in corresponding U.S. Appl. No. 13/035,665, filed Feb. 25, 2011, 13 pages.
Non-Final Office Action dated Sep. 22, 2010 in corresponding U.S. Appl. No. 11/438,168, filed May 22, 2006, 14 pages.
Notice of Allowance dated Apr. 12, 2012 in corresponding U.S. Appl. No. 13/035,665, filed Feb. 15, 2011, 7 pages.
Notice of Allowance dated Aug. 8, 2013 in corresponding U.S. Appl. No. 13/296,329, filed Nov. 15, 2011, 6 pages.
Notice of Allowance dated Nov. 7, 2013 in corresponding U.S. Appl. No. 13/531,187, filed Jun. 22, 2012, 11 pages.
Notice of Allowance dated Sep. 13, 2013 in corresponding U.S. Appl. No. 13/569,990, filed Aug. 8, 2012, 17 pages.
U.S. Notice of Allowance dated Nov. 7, 2013 in corresponding U.S. Appl. No. 13/531,187, filed Jun. 22, 2012, 11 pages.
408UL Installation Manual CMXaL V7.1, 402 pgs., Mar. 2003.
408UL Reference Traing Guide, Chapter 5 Vibroseis Operations, 72 pgs, Customer Support Department, Last modification Jun. 15, 2000.
408UL Reference Training Guid Chapter 104, Radiocommunications, 61 pgs, Sercel Customer Support Department, Issue: Jun. 26, 2000.
408UL Reference Training Guide Chapter 101, 44 pgs., SERCEL Customer Support Department, Issue date Jun. 26, 2000.
408UL Reference Training Guide Chapter 102 Communications Networks, 28 pgs, Issued on Jun. 26, 2000.
408UL Reference Training Guide Chapter 201 Glossary Issued on Jun. 26, 2000 8pgs.
408UL Reference Training Guide—Chapter 2a, Seismic Areal Network, 100 pgs, Last Modificaion: May 1, 2001.
408UL Reference Training Guide Chapter 2-b, Seismic Areal Network Radio Equipment, Sercel Customer Support Department last modification on May 1, 2001.
408UL Reference Training Guide Chapter 7, SPS APS Files Management, 36 pages, Sercel Customer Support Department, Feb. 11, 2000.
408UL Reference Training Guide Chapter 8, On Line Seismic Quality Control SQC-Pro, 40 pgs., Sercel Customer Support Department, last modification on Dec. 1, 2000.
408UL Reference Training Guide, 4 pgs, issued on Jan. 2001.
408UL Reference Training Guide, Chapter 1, Training Course Overview, 29 pgs, last modification on Nov. 10, 2000.
408UL Reference Training Guide, Chapter 3, Seismic Software Network, 34 pgs, last modification on Jun. 15, 2000.
408UL Reference Training Guide, Chapter 4, 408UL Control Module Hardware, 52 pgs, Sercel Customer Support Department, last modification on Oct. 17, 2000.
408UL Reference Training Guide, Chapter 6, Real Time Positioning, 75 pgs, Sercel Customer Support Department, Jan. 25, 2001.
408UL Reference Training Guide, Chapter 9 Field Know-How, 16 pgs, Issued on Jun. 26, 2000.
408UL Technical Manual, 406 pgs., Apr. 2003.
408UL User's Manual vol. 1, 652 pgs., Jan. 2002.
408UL Users Manual vol. 1, CMXL V7.1, 710 pgs., Jan. 2003.
408UL User's Manual, vol. 2, 234 pgs, Apr. 2003.
408UL, Users's Manual vol. 3, 338 pgs., May 2003.
Agre, Jonathan R: Development Platform for Self-Organizing Wireless Sensor Networks, 3713 SPIE Conf. on Unattended Ground Sensor Techs and Applications 257 (Apr. 1999).
Akyildiz, Ian F. et al. Challenges for Efficient Communication in Underwater Acoustic Sensor NEtworks, 6 pages.
Akyildiz: A Survey on Sensor Networks, 40 IEEE Comms. Mag 102-114 (2002).
Akyildiz: Wireless Sensor Networks: a Survey, 38 Computer Networks 393-422 (2002).
Ansi/IEEE STD 802.11, Part 11: Wireless LAN Medium Access Control (MAC) and Physical Layer (PHY) Specifications (1999).
Beffa, Mihai et al.,Very High Speed Ordered Mesh Network of Seismic Sensors for Oil and Gas Exploration, 5 pages, IEEE 2007.
Bremner, Seismic Acquisition Near a Large Compressor Plant, pp. 681-682, downloaded on Apr. 29, 2014.
Buttyan, Levente et al., Spontaneous Cooperation in Multi-Domain Sensor Networks, 12 pages.
Chen et al., Energy-Efficient Data Aggregation Hierarchy for Wireless Sensor Networks, 8 pgs, School of Computing Science Simon Fraser University.
Clare, Self-Organizing Distributed Sensor Networks, 9 pgs.
CTR Table of Contents Schematics and Assemblies CTR.
Cui, Jun-Hong et al. Challenges: Building Scalable and Distributed Underwater Wireless Sensor Networks (UWSNs) for Aquatic Applications, 17 pages, Sep. 2005.
Culler: MICA: The Commercialization of Microsensor Motes, 5 pgs, Apr. 1, 2002.
Dai, Hui et al. "TSync: A Lightweight Bidirectional Time Synchronization Service for Wireless Sensor Networks." 12 Pages.
Data Collector Table of Contents Schematics and Assemblies.
DCU Operators Manual, 82 pgs, Apr. 1998.
Deng et al., Intrusion Tolerance and Anti-Traffic Analysis Strategies for Wireless Sensor Networks, 10 pgs, University of Colorado.
End User License Agreement Input/Output, Inc. and Systems Manual CD/ROM, 3 pgs.
Equipment Installation Guide Table of Contents, 55 pgs.
Ergen, Sinem et al., TDMA Scheduling Algorithms for Sensor Networks, 12 pages, Jul. 2, 2005.
F.L. Lewis: Wrireless Sensor Networks, 18 pages, 2004.
Field of Service Bulletin No. 1 88 pgs, Aug. 13, 1989.
Giannakis, Georgios B.: Wideband Generalized Multi-Carrier CDMA over Frequency-Selective Wireless Channels. 5 IEEE International Conf. on Acoustics, Speech, and Signal Processing Proc. 2501 (2000).
Haartsen et al., A New Low Power Radio Interface Providing Short Range Connectivity, Member IEEE, vol. 88, pp. 1651-1661, No. 10 Oct. 2000.
I/O Archiver Operator019s Manual, 28 pgs, Apr. 1998.
I/O Bill of Materials, Report date Jul. 27, 1998., 3066 pgs.
I/O System One, Central Electronic Diagnostics Manual, 176 pgs, Stafford, Texas, Oct. 1990.
I/O System Two Performance Manual, 273 pgs, Stafford, Texas, 1993.
I/O System Two RSR Cables Manual Table of Contents.
I/O System Two RSX Frequency Response Generator Operations, 5 pgs, Jun. 1998.
I/O System Two Seismic Telementry Dat AcQuisition System, 20 pgs., SPEC-MRX-XXE, Printed in USA, 1991, 1992, and 1993.
I/O System Two, Land System Field Deployment, 83 pgs, Jun. 1998.
I/O System Two: Hardware and Software Set-Up Procedure, 34 pgs, May 1998.
Input/Output, Inc., System II Operations Course Curriculum, 1 pg.
Intanagonwiwat et al.: Directed Diffusion: A Scalable and Robust Communication Paradigm for Sensor Networks, Proc. of the ACM Mobi-Com 00, Boston, MA Aug. 2000 pp. 56-67.
IO Customer Support Hotline, 1pg.
IO Humidity Sensor Drawings 2pgs.

(56) References Cited

OTHER PUBLICATIONS

IO Input/Output, Inc. Land Bird-Dog Training Course Curriculum 1pg.
IO 10 Input/Output, Inc. System II Central Electronics Maintenance Course Curriculum 1pg.
IO Input/Output, Inc. System II MRX 3-Day Maintenance Course Curriculum 1 pg.
IO Input/Output, Inc. System II MRX/ALX/MLX Maintenance Course Curriculum 1 pg.
IO Input/Output, Inc. System II RSR Maintenance Course Curriculum 1pg.
IO Input/Output, Inc. System II RRS Operations Course Curriculum 1pg.
IO Land Systems Manuals, Schematics and Assemblies, 1 pg.
IO Training for the I/O Land System, 1 pg.
Kalyan, Andra S. "Tracking Phenomena with Sensor Networks." 82 pages. Jan. 24, 2005.
Kim et al.: Frequency-Hopped Multiple-Access Communication with Multicarrier On-Off Keying in Rayleigh Fading Channesl, 48 IEEE Transactions on Communications (Oct. 2000).
Leguay, Jeremie et al.: An Efficient Service Oriented Architecture for Heterogeneous and Dynamic Wireless Sensor Networks, 8 pages.
LIM Theory of Operations, 340 pgs.
Lynch, Jerome et al.: A Summary Review of Wireless Sensors and Sensor Networks for Structural Health Monitoring, 38 pages, Mar. 2006.
McCarthy et al., Data Report for the 1991 Bay Area Seismic Imaging Experiment (Basix)Menlo Park, CA 09025, 1993.
Milanovic N. et al.: Bluetooth Ad-Hoc Sensor Network, Proc. 2002 International Conference Advances in Infrastructure for e-Business, e-Education, e-Science, and e-Medicine on the Internet, (Jan. 2002).
MRU User's Manual, Software version 2.0, 98 pgs., Documentation Part No. 0311355, issued on Jan. 2002.
Ning Xu: A Wireless Sensor Network for Structural Monitoring, 12 pgs, SenSys '04, Nov. 3-5, 2004, Baltimore, Maryland, USA.
Office Action dated May 3, 2012 issued in co-pending U.S. Appl. No. 13/296,329.
Olarui, Stephan: Information Assurance in Wireless Sensor Networks, 50 pages.
Park, Jong T. "Management of Uniquitous Sensor Network," 73 pages, 2005.
POOR: Reliable Wireless Networks for Industrial Systems, Ember Corporations (2002).
Porter, John et al.: Wireless Sensor Networks for Ecology, 12 pages, Jul. 2005.
Property of Input/output, Inc., Contents Apr. 7, 1998.
Ringwald, Matthias et al., BurstMAC—An Efficient MAC Protocol for Correlated Traffic Bursts. 9 pages.
RSR Operations Manual, 388 pgs, Apr. 9, 1998.
RTS Opertator's Manual, 208 pgs, Stafford, Texas 77477, Mar. 1998.
Savazzi, S et al., Short-range Wireless Sensor Networks for High Density Seismic Monitoring. 5 pages.
Savazzi, S et al., Synchronous Ultra-Wide Band Wireless Sensors Networks for Oil and Gas Exploration. 6 pages, IEEE 2009.
SCM Theory of Operations.
The I/O Land System 1 pg.
The I/O System Operations Manual, 627 pgs., Stafford, Texas, Aug. 1997.
The I/O System Tape Header Format, 17 pgs, Sep. 1998.
Tian, Jingwen et al., Multi-Channel Seismic Data Synchronizing Acquisition System Based on Wireless Sensor Network. 4 pages, Oct. 1, 2007.
US Office Action dated Jul. 18, 2014 on U.S. Appl. No. 14/280,318.
US Office Action dated Jun. 23, 2014 on U.S. Appl. No. 14/100,940.
US Office Action dated Jun. 23, 2014, on U.S. Appl. No. 14/261,102.
US Office Action for U.S. Appl. No. 14/258,620 DTD Jun. 5, 2014.
US Office dated Jul. 30, 2014 on U.S. Appl. No. 14/273,303.
Werner-Allen et al., Deploying a Wireless Sensor Network on an Active Volcano, 8 pgs, IEEE Computer Society, Mar. and Apr. 2006.
Wilden, Jason et al.: Position and Orientation for Distributed Sensors: The PODIS Network, 16 pages, Aug. 24, 2004.
Wireless Integrated Networks Sensors (WINS) Next Generation, Defense Advanced Research Projects Agency, 65 pgs., Mar. 2004.
Wireless Seismic, Inc.s Invalidity Contentions Pursuant to Local Patent Rule 3-3, Jul. 12, 2014.

* cited by examiner

METHOD AND SYSTEM FOR TRANSMISSION OF SEISMIC DATA

CROSS-REFERENCE TO RELATED APPLICATIONS

This application claims the benefit of priority under 35 U.S.C. §120 as a continuation of Ser. No. 14/100,940, filed Dec. 9, 2013, which claims the benefit of priority under 35 U.S.C. §121 as a divisional of U.S. patent Ser. No. 13/569,990, filed Aug. 8, 2012, which claims the benefit of priority under 35 U.S.C. §120 as a continuation of U.S. patent application Ser. No. 13/532,426, filed Jun. 25, 2012, now abandoned, which claims the benefit of priority under 35 U.S.C. §120 as a continuation of U.S. patent application Ser. No. 13/035,665, filed Feb. 25, 2011, which issued as U.S. Pat. No. 8,296,068 on Oct. 23, 2012, which claims the benefit of priority under 35 U.S.C. §120 as a continuation of U.S. patent application Ser. No. 11/438,168, filed May 22, 2006, which issued as U.S. Pat. No. 7,983,847 on Jul. 19, 2011, which claims the benefit of priority under 35 U.S.C. §121 as a divisional of U.S. patent application Ser. No. 10/719,800, filed on Nov. 21, 2003, which issued as U.S. Pat. No. 7,124,028 on Oct. 17, 2006, each of which are incorporated by reference herein in their entirety.

FIELD OF THE INVENTION

The present invention relates to seismic data acquisition, and more particularly to a method and system for transmitting data between multiple remote stations in an array and a data collection station utilizing a linked relay system to communicate therebetween permitting transmission paths to be altered.

DESCRIPTION OF THE RELATED ART

Seismic exploration generally utilizes a seismic energy source to generate an acoustic signal that propagates into the earth and is partially reflected by subsurface seismic reflectors (i.e., interfaces between subsurface lithologic or fluid layers characterized by different elastic properties). The reflected signals are detected and recorded by seismic units having receivers or geophones located at or near the surface of the earth, thereby generating a seismic survey of the subsurface. The recorded signals, or seismic energy data, can then be processed to yield information relating to the lithologic subsurface formations, identifying such features, as, for example, lithologic subsurface formation boundaries.

Typically, the seismic units or stations are laid out in an array, wherein the array consists of a line of stations each having at least one geophone attached thereto in order to record data from the seismic cross-section below the array. For data over a larger area and for three-dimensional representations of a formation, multiple lines of stations may be set out side-by-side, such that a grid of receivers is formed. Often, the stations and their geophones are remotely located or spread apart. In land seismic surveys for example, hundreds to thousands of geophones may be deployed in a spatially diverse manner, such as a typical grid configuration where each line of stations extends for 5000 meters with stations spaced every 25 meters and the successive station lines are spaced 200 meters apart.

Various seismic data transmission systems are used to connect remote seismic acquisition units to a control station. Generally, the seismic stations are controlled from a central location that transmits control signals to the stations and collects seismic and other data back from the stations. Alternatively, the seismic stations may transmit data back to an intermediate data collection station such as a concentrator, where the data is recorded and stored until retrieved. Whichever the case, the various stations are most commonly hard wired to one another utilizing data telemetry cable. Other systems use wireless methods for control and data transmission so that the individual stations are not connected to each other. Still other systems temporarily store the data at each station until the data is extracted.

In the case of wired stations, typically several geophones are connected in a parallel-series combination on a single twisted pair of wires to form a single receiver group or channel for a station. During the data collection process, the output from each channel is digitized and recorded by the station for subsequent analysis. In turn, stations are usually connected to cables used to communicate with and transport the collected data to recorders located at either a control station or a concentrator station.

In the case of wireless seismic units, each unit communicates with either a central control station or concentrator via radio transmissions. Transmissions are made either directly between each seismic unit and the control station or directly between each seismic unit and the concentrator. To the extent the transmissions are high power, long-range signals, such as between a seismic acquisition unit and a central control station, the transmissions generally require a license from the local governing authority. Units capable of such transmissions also have higher power requirements and thus require larger battery packages. To the extent the seismic acquisition units transmit to a concentrator station utilizing a low power, short-range signal, the transmitting and receiving units must typically have a line of site therebetween.

Illustrative of the prior art is U.S. Pat. No. 6,070,129 which teaches a method and apparatus for transmitting seismic data to a remote collection station. Specifically, an acquisition unit having a geophone attached thereto communicates with a central station either directly by radio channels, or optionally, by means of an intermediate station. To the extent a large number of acquisition units are utilized, the patent teaches that each a plurality of intermediate stations may also be utilized, wherein each intermediate station directly communicates with a portion of the acquisition units. Intermediate stations may function as data concentrators and may also be utilized to control various tasks executed by their respective groups of acquisition units. Whether data is transmitted directly between an acquisition unit and the central station or directly between an acquisition unit and an intermediate station, the transmitting system accumulates seismic data, distributes the data over successive transmission windows and discontinuously transmits the data during successive transmissions in order to lessen variation in seismic data flow.

Similarly, U.S. Pat. No. 6,219,620 teaches a seismic data acquisition system using wireless telemetry, in which a large number of remote seismic acquisition units are grouped together into a plurality of cells and each acquisition unit within a cell communicates directly with a cell access node, i.e., a concentrator, which in turn communicates with a central control unit. This patent teaches that in order to avoid overlap between transmitting seismic units within adjacent cells, adjacent cells utilize different frequencies for communication between units and their respective cell access nodes. In other words, adjacent cells operate at different frequencies so that a particular acquisition unit is only capable of transmitting to the cell access node assigned to its cell.

One drawback to the aforementioned seismic transmission systems of the prior art is that the failure of any one intermediate transmission station or cell access node will prevent communication with a plurality of seismic acquisition units. Furthermore, to the extent an individual unit is prevented from transmitting back to its respective cell access node due to factors external to the unit, the participation and operation of that unit within the array is lost. For example, a unit may lose radio contact with an access point due to a weak signal, weather conditions, topography, interference from other electrical devices operating in the vicinity of the unit, disturbance of the unit's deployment position or the presence of a physical structure in the line of site between the unit and the access point.

Thus, it would be desirable to provide a communication system for a seismic survey array that has flexibility in transmitting signals and data to and from remote seismic units and a control and/or data collection station. The system should be capable of communication between functional seismic units even if one or more intermediate stations fail to operate properly. In addition, the system should be capable of communication between functional seismic units even if a change in environmental or physical conditions inhibits or prevents a direct transmission between a remote unit and its control station.

SUMMARY OF THE INVENTION

The method according to the invention transmits radio signals between individual seismic acquisition units in an array, such that the transmissions can be passed in a relay chain through the array of seismic units. Multiple seismic acquisition units within the array are capable of passing transmissions to multiple other seismic units. More specifically, any one seismic acquisition unit in the array is capable of transmitting radio signals to several other seismic acquisition units positioned within radio range of the transmitting seismic acquisition unit. A network of radio-linked seismic acquisition units such as this permits seismic data transmission routes back to a control station to be varied as desired or needed. In other words, the transmission path utilized to transmit data from the individual seismic acquisition units in an array back to a control station may be altered. In transmissions up the chain, i.e., from the most remote seismic acquisition unit to the control station, each unit receives seismic data from a seismic unit "down" the chain and transmits the received seismic data up the chain along with receiving unit's locally stored seismic data. Preferably, as a transmission moves up the chain, it is bounced between seismic acquisition units so as to be relayed by each unit in the array. The specific transmission path, i.e., the chain of units, for any given transmission may vary between transmissions depending on overall system requirements. Control signals and the like can be passed back down the chain along the same or a different transmission path.

The transmitted signal strength can be altered to adjust the transmission range for a transmitting seismic unit, such that number of potential receiving seismic acquisition units can be controlled. In one embodiment, each seismic acquisition unit is omni-directional in its transmission and is capable of linking to all units within a 360° range around the transmitting unit. Alternatively, a transmitting seismic unit may utilize a directional antenna such that transmissions are made only to one or more seismic acquisition units in a limited or single direction or more limited range of transmission.

Preferably the individual seismic acquisition units are wireless and require no external cabling for data transmission or unit control. Such units may contain a battery, a short-range radio transmitter/receiver, a local clock, limited local memory, a processor and a geophone package. In one embodiment, each unit may include a short-range radio transmission antenna molded or otherwise integrated into the casing of the unit. In another embodiment, each unit may include external spikes that are used not only to couple the unit to the earth, but also as a conductive conduit through which the unit's batteries can be recharged.

At least one and preferably a plurality of seismic acquisition units in the network are located in the proximity of the control station so that the network can utilize short-range radio frequency to transmit seismic data all the way back to the control station. In another embodiment of the invention, the control station is remotely located from the seismic units and one or more concentrators are located in the proximity of the seismic acquisition units of the network so that the network can utilize short-range radio frequency to transmit seismic data to the concentrators. The concentrators, in-turn, can store the seismic data and/or transmit it back as desired to a control station.

Such a concentrator may include a long range transmitter/receiver for communicating with a control station, a short range transmitter/receiver for communicating with the seismic acquisition unit network, mass memory for long-term storage of the collected seismic data from the network, a power source, a local clock and a processor. In one embodiment, the concentrators may communicate with the control station via telemetry cable, while communicating with the seismic acquisition network via short range transmission.

Within the transmission network, there are multiple transmission paths from the most remote unit to the control station/concentrator. The particular transmission path to be used for any given transmission will be determined based on the strength of the signal between communicating units, the operational status of a unit and path efficiency.

DESCRIPTION OF THE PREFERRED EMBODIMENTS

In the detailed description of the invention, like numerals are employed to designate like parts throughout. Various items of equipment, such as fasteners, fittings, etc., may be omitted to simplify the description. However, those skilled in the art will realize that such conventional equipment can be employed as desired.

Figure 1:
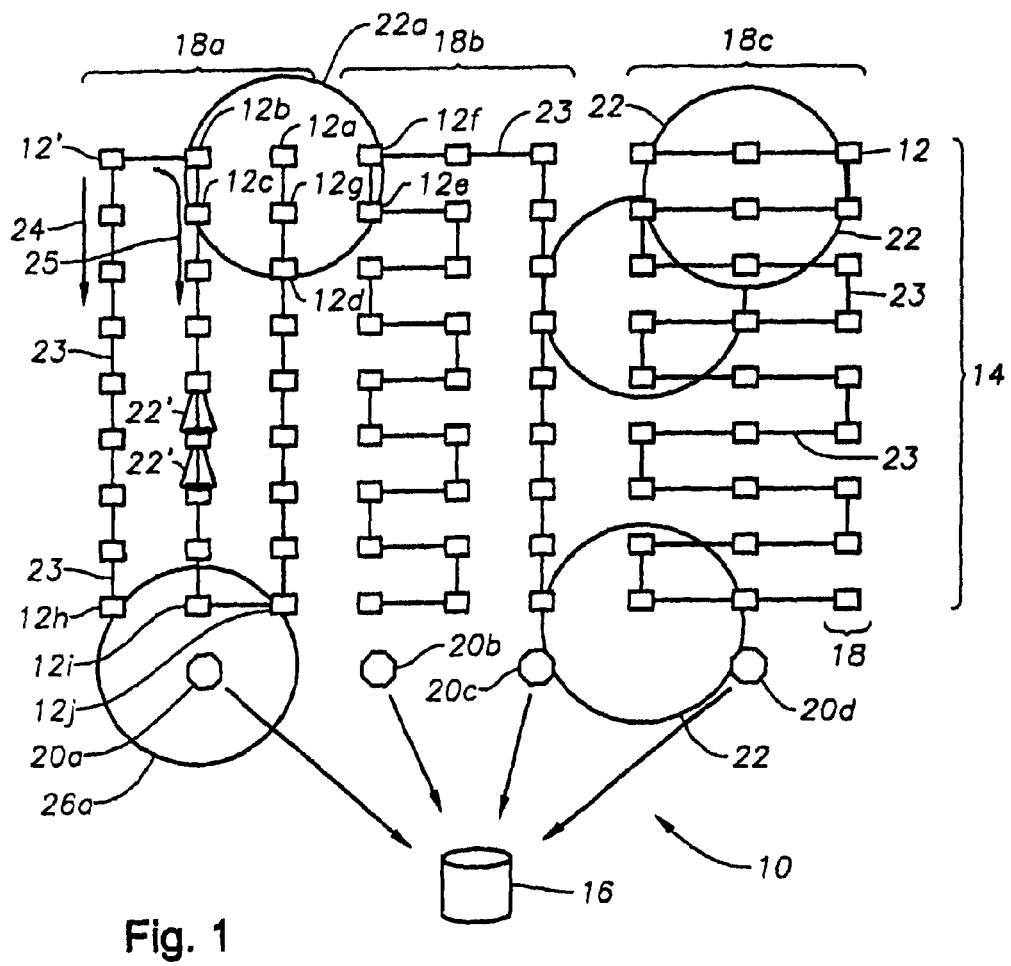
FIG. 1 is a top view of a seismic acquisition array illustrating possible transmission paths between seismic acquisition unit strings in the array.

With reference to FIG. 1, there is shown a seismic data transmission network 10 of the invention. Transmission network 10 is comprised of a plurality of seismic acquisition units 12 spread out in a seismic array 14 and controlled by control station 16. Array 14 is formed of multiple lines 18 of acquisition units 12. Radio transmissions, and in particular, seismic data, are passed from seismic unit 12 to seismic unit 12 as the transmission is bounced through the network 10 to control station 16. In one embodiment of network 10, concentrators 20 are disposed between array 14 and control station 16. While the invention will be described in more detail with references to transmission of seismic data, those skilled in the art will understand that the invention encompasses any type of transmissions from a seismic unit, including, without limitation, quality control data.

Each acquisition unit 12 has an omnidirectional transmission range 22 and can form a wireless link 23 with multiple acquisition units 12. As shown, within the transmission range 22 of a unit 12, there are multiple other units 12 capable of receiving the transmission, in essence forming a local area network comprised of acquisition units 12. For example, unit 12a has an omnidirectional transmission range 22a. Falling within the transmission range 22a of unit 12a are seismic acquisition units 12b-12g. With the flexibility to transmit to multiple acquisition units 12 each having the ability to receive and transmit seismic data to multiple other units 12 within the array 14, each unit 12 within array 14 is presented with multiple paths for communicating seismic data back to control station 16. For example, unit 12' can transmit data back to control station 16 by sending it along path 24, along path 25 or along some other path as determined by the requirements of network 10.

In another embodiment, a transmitting seismic unit 12 may utilize directional radio antenna or antenna array such that transmissions are substantially unidirectional and made only to one or more seismic acquisition units 12 in a limited direction. It is common in the art to utilize phased antenna arrays— an array consisting of two or more antenna's—to achieve transmission directionality and gain improvement. In these types of antenna arrangement, various adjustable antenna parameters, such as phase, can be altered to control directionality and gain, and hence, transmission range. Thus, for purposes of this description, "unidirectional" means a transmission with a higher gain along one axis or in a limited direction, whereas "omni-directional" means a transmission with generally the same gain in substantially 360°. This will maintain the flexibility to transmit to multiple units in the direction the transmitting antenna is pointed, while reducing the number of path options that need to be processed by the overall system, thereby multiple paths to be transmitted on the same frequency at the same time without interfering with one another. In addition, a higher gain in a single or limited direction can be achieved without the need for additional power, or alternatively, power requirements can be decreased, and thus battery life extended, while maintaining the same gain as an omnidirectional signal.

In the illustration of FIG. 1, array 14 is shown as being comprised of three seismic acquisition unit strings 18a, 18b, and 18c. Each string 18a, 18b, and 18c illustrates a different potential transmission path defined by wireless links 23 between the units 12 within a string. Those skilled in the art will understand that the indicated wireless links 23 are for illustrative purposes only and, for purposes of the invention, a "string" 18 of seismic units 12 for a particular transmission path is defined by the selected transmission path by which data is communicated from one unit 12 to another. Thus, for any given array 14, a "string" of units may be constantly changing between transmissions. Such an arrangement permits transmissions to be re-routed in the event of some failure of a unit 12 within the string. Likewise, transmissions can be re-routed in the event of a weak signal between units 12 or to overcome topographic or other obstacles that could interfere with short range, line of site transmissions. Furthermore, in addition some failure of a unit, it may be desirable to reroute a transmission simply because of the operational status of a unit. For example, a unit with lower battery power may be utilized downstream at the end of a string and avoided as a transmission relay further upstream in order to conserve the unit's batteries, i.e., upstream relay units require more power to relay the transmission because of the cumulative size of the transmissions.

In the event multiple adjacent strings are desired, radio transmission parameter assignments may be made to minimize interference with other transmissions and permit reuse of the same transmission parameters. For example, string 18a may transmit data at a first set of radio transmission parameters while string 18b may transmit data at a second set of parameters. Since the transmissions from a sting 18 are short range, it may only be necessary for adjacent strings to utilize different transmission parameters. In this regard, the physical seismic unit layout of a portion of array 14 defined as a string 18 may be dependent on the short range transmission capabilities of the seismic units 12 in the adjacent string. Non-adjacent strings utilizing the same string are sufficiently spaced apart so as not to interfered with one another. In other words, string 18b is defined such that its width is sufficient to ensure that any transmission from a seismic unit 12 from string 18a transmitting with a certain set of radio transmission parameters will not be received by any seismic unit 12 from string 18c set to receive transmissions using the same set of radio transmission parameters. Those skilled in the art will understand that there are many transmission parameters that can be adjusted in this regard, including the non limiting examples of frequencies, time slots, power, methods of modulation, directional antenna gain, physical spacing of units and strings, etc. Of course, interference between adjacent strings, as well as individual units, may also be minimized by making transmissions in discreet data packages sent in short transmission bursts.

Furthermore, while three strings 18 are depicted to indicate possible transmission paths, system 10 can comprise any number of strings. The number of strings for any given group of transmissions is dependent on the system requirements. For example, rather than multiple strings, each acquisition unit 12 in an array 14 may be utilized in a single transmission path such that the entire array 14 might be considered a "sting" for purposes of the description. Those skilled in the art will understand that the number of transmission paths and the number of acquisition units utilized for any given transmission may constantly be in flux to maximize the operation requirements for a particular transmission or group of transmissions.

In each case, the transmitted signal strength of a seismic unit 12 can be altered to adjust the transmission range for a transmitting seismic unit such that number of potential receiving seismic acquisition units 12 can be controlled.

At least one and preferably a plurality of seismic acquisition units 12 in network 10 are proximately located to control station 16 so that network 10 can utilize short-range radio frequency to transmit seismic data to control station 16 from the seismic units 12. However, large amounts of data transmitted to a control station may be difficult to manage and typically requires high power, long range transmitters. Thus, in one embodiment of the invention, data is accumulated and stored at multiple, dispersed concentrators 20 remote from control station 16. By accumulating seismic data at concentrators 20, the need for radio licenses and other requirements associated with long range transmissions may be avoided. Concentrators 20 are located in the proximity of the seismic acquisition units 12 of the network 10 so that the network 10 can utilize low power, short-range radio transmission to transmit seismic data to the concentrators 20. The concentrators 20, in-turn, can store the seismic data or transmit it back as desired to control station 16. In one embodiment, concentrators locally store seismic data but transmit quality control data received from the acquisition units back to control station 16.

Much like the individual acquisition units 12, each concentrator 20 preferably also has a transmission range 26 that encompasses several seismic acquisition units 12. As within the array 14, transmission of data from a string 18 to the accumulator 20 may be made from a plurality of units 12. For example, accumulator 20a has an omnidirectional transmission range 26a. Falling within the transmission range 26a of accumulator 20a are seismic acquisition units 12h-12j. As such, any of acquisition units 12h-12j may transmit seismic data from string 18a to accumulator 20a. Thus, a failure of one of the acquisition units, such as 12h, would not prevent seismic data from string 18a from being passed up the line. Rather, the transmission path from string 18a to concentrator 20a would simply be rerouted through an operative acquisition unit, such as units 12i or 12j. Concentrators 20 may also be positioned so as to be within the short range transmission distance of adjacent concentrators.

As described above, network 10 can function as either a one-way network, i.e., concentrators 20 are utilized only to receive seismic data transmitted from array 14, or a two-way network, i.e., concentrators 20 transmit command signals out to array 14 in addition to receiving seismic data transmitted from array 14.

In another configuration, seismic data is transmitted back from array 14 utilizing the network of linked seismic acquisition units 12, but control signals are transmitted directly to each acquisition unit 12 from either the control station 16 or an associated concentrator 20. In such case, an acquisition unit 12 may be capable of receiving long range transmissions directly from a distant source with sufficient transmission power for such communications, i.e., control station 16, an associated concentrator 20 or radio repeater stations utilized to extend range, even though the acquisition unit 12 itself is only capable of short range hopped transmissions for sending seismic data back to the control station or concentrator.

Transmissions to control station 16 from accumulators 20 or acquisition units 12 may also include global positioning system ("GPS") or other survey information to establish the location of a particular unit 12 for purposes of the shot and for purposes of retrieval. This is particularly desirable for wireless units as described herein since it may be difficult to locate such units upon retrieval. GPS survey information may also be useful in selection of a transmission path within an array as described above.

In operation, a preferred transmission path may be preset in units 12 or predetermined. Likewise, alternate transmission paths may be preset in units 12 or predetermined. These preset paths, as well as the number of paths required for a particular array 14, are determined based on the volume of the data to be transmitted, the data transmission rates, signal strength and the number of "real time" radio channels having different transmission parameters such that the radio transmission channels are non-interfering, battery power, location of the unit, etc.

Prior to a transmission or a set of transmissions along a string, a beacon signal may be utilized to verify the preferred transmission path in much the same way as an ad hoc network or peer to peer network identifies systems within the network. Alternatively, rather than transmitting data utilizing a preset or predetermined path, the beacon signal may be used to establish a transmission path utilizing the above described parameters. If a beacon signal is transmitted and the preferred transmission path is not available, system 10 will search for another transmission path through the seismic units. In one embodiment, the beacon signal is transmitted and the local units within range send a return signal acknowledging their receipt of the beacon signal. Once a path is verified or established, as the case may be, the path may be "locked in" for purposes of the particular transmission so that system 10 will not continue searching for another path. The beacon signal may be generated from within the array 14 by the seismic units themselves or initiated by the control station or concentrator.

A synchronization signal may also be used to synchronize the recording time for the units of system 10 by establishing a future time t(0) at which trace recording by seismic units 12 is to begin. In contrast, the prior art typically sends out a pulse signal that immediately triggers recording by each seismic unit at the time it receives the signal such that prior art seismic units located closer to the signal source begin recording earlier than seismic units more remote from the signal source. In a preferred embodiment of the invention, all seismic units 12 may be set to start recording at a specific clock time, such that data transmitted back through network 10 is time stamped based on the synchronization shot time. In this regard, all data is time synchronized regardless of the transmission path utilized by the network or the period of time the network takes to transmit the data through the network.

In this same vein, it is also desirable to ascertain the data delay along the path based on master clock time so that data that is not time stamped can be synchronized with the data from other seismic units. The described network 10 permits data to be retrieved via radio transmission in real time or near real time.

Figure 2:
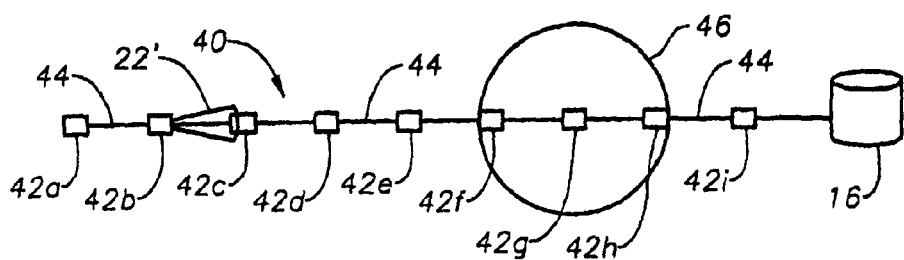
FIG. 2 is a top view of a seismic data transmission path utilizing seismic acquisition units.

While the invention has been described in its broadest sense as possessing the flexibility to alter data transmission paths, i.e., each unit has wireless links with multiple other units, in order to convey acquired seismic data from an array of acquisition units back to a control station or concentrator, it is also true that none of the prior art transmission systems utilize seismic data acquisition units as intermediate transmission devices. Thus, one aspect of the invention as illustrated in FIG. 2 is the use of seismic data acquisition units 12 themselves, configured in a predetermined string, as intermediate devices for passing transmissions from a seismic unit in the string to a control station. In this regard, a string 40 of seismic units 42 is predetermined and defined by an outermost unit 42a and a plurality of intermediate units 42b through 42i. Each unit 42 in string 40 has a wireless link 44 within its transmission range 46 only with the units directly up and directly down the string. For example, seismic unit 42g is only capable of communication with seismic units 42f and 42h via their respective wireless links 44 because only units 42f and 42h are within the transmission range 46 of unit 42g. Upon acquisition of data, unit 42g will transmit the acquired data up the string to 42h, along with any data received by wireless transmission from 42f. All seismic data from the units 12 comprising string 40 will be conveyed up the string to control station 16. Control station 16 can likewise utilize the seismic units 12 to pass control and command signals back down the string.

As mentioned above, one benefit of the invention is the ability to utilize flexible transmission paths that can be readily changed based on various internal and external parameters effecting the network. This flexibility also renders the network itself much more reliable. Preferably, transmission paths can be established and/or rerouted on-the-fly based on these parameters. Another advantage of the system is that it utilizes less power in transmitting a signal over a given distance via multiple short transmissions than would be required of a single transmission over the same distance. In other words, because the power required to transmit a signal decreases as one over the square of the transmission distance, it is much more optimal to transmit a signal in several short hops than it would be to transmit the same signal over the same distance in a single hop. This is true even of low power, short range transmissions. Of course an additional advantage of the system of the invention is that it avoids the need to acquire long range radio transmission licenses. Finally, unlike the prior art, the system of the invention eliminates the need to physically locate a concentrator or similar device in the middle of a seismic array, nor utilize the concentrator to sort and organize multiple seismic data transmissions incoming directly from individual seismic acquisition units.

Figure 3:
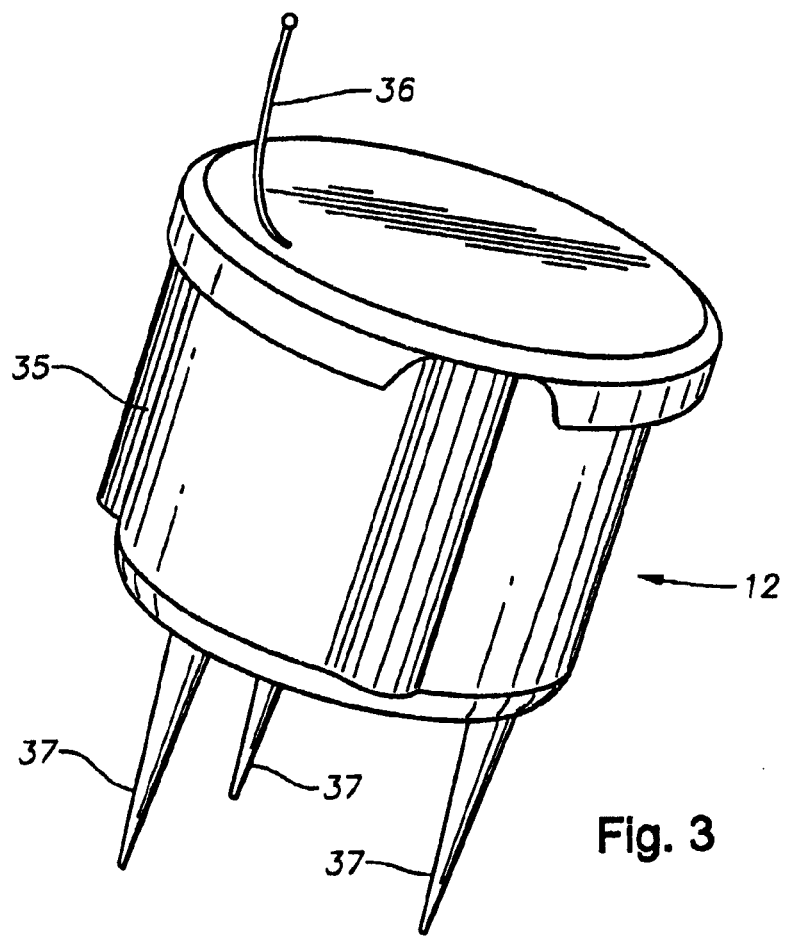
FIG. 3 is an elevation view of a seismic acquisition unit of the invention.
Figure 4:
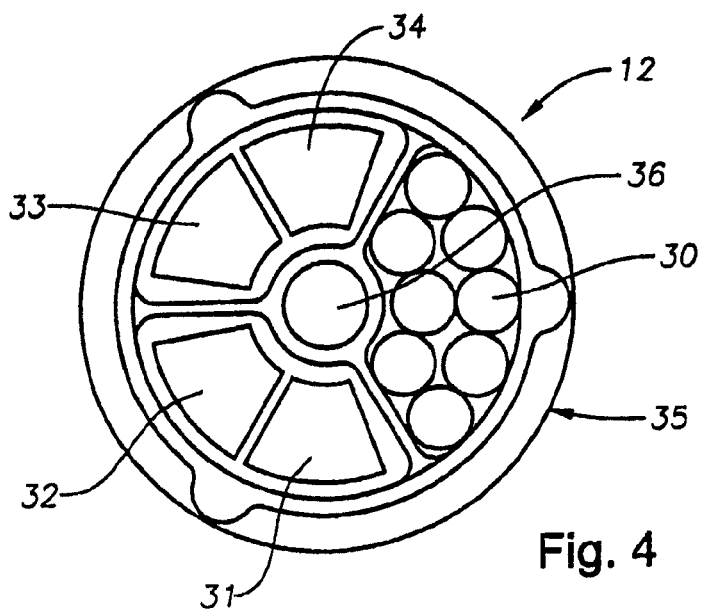
FIG. 4 is a cut-away top view of the unit of FIG. 2.

Turning to the individual seismic acquisition units as illustrated in FIGS. 3 and 4, each unit 12 is preferably wireless and requires no external cabling for data transmission or unit control. Each unit 12 may contain a battery 30, a short-range radio transmitter/receiver 31, a local clock 32, limited local memory 33, and a processor 34 housed within a casing 35. A geophone package 36 may be housed within the casing 35 or externally attached thereto. Any standard short range radio transmission equipment may be utilized. One non-limiting example being wireless fidelity ("Wi-Fi") equipment, where transmission parameters may be selected to provide signal carrier modulation schemes such as complementary code keying (CCK)/packet binary convolution (PBCC) or direct sequence spread-spectrum (DSSS) or multi-carrier schemes such as orthogonal frequency division multiplexing (OFDM) and code division multiple access (CDMA). Local memory capacity is preferably limited since local seismic data is only retained for a short period of time. Further, because the unit 12 need only transmit a short range signal, power requirements for the unit are minimized in contrast to the increased power requirements necessary to transmit a stronger signal to a more distant receiving device. By reducing the memory requirements, the transmission requirements and the battery requirements, the overall cost, as well as the physical size and weight, of each unit is minimized.

While each unit may include an antenna, attached via an external connector, in one embodiment of the invention, each unit 12 may include a short-range radio transmission antenna 36 molded or otherwise integrated into the casing 35 of the unit. This eliminates the need for an external connector. Each unit 12 may also include radio frequency identification or similar identification indicia, such as a bar code. Finally, each unit 12 may include a receiver for receiving long range radio transmissions directly from a control station or concentrator as described above.

In another embodiment, each unit 12 may include external projections or spikes 37 that are used not only to couple the unit to the earth, but also as an electrically conductive conduit through which the unit's internal batteries 30 can be recharged. Such a configuration minimizes the need for external connectors which are known in the industry as a source of various problems such as corrosion, leakage, etc. or alternatively, the need to otherwise open the sealed unit. While any shape, length or number of projections or spikes may be utilized, one preferred configuration utilizes three spikes that can also be utilized to couple the unit to the earth. In a three spike configuration, two of the spikes are connected to the battery through a relay or similar mechanism. The third spike would be used to control the relay. During charging, the relay would be closed; after charging, the relay would be open to prevent battery discharge.

Concentrator 20 (not shown) may include a long range radio transmitter/receiver for communicating with a control station 16, a short range radio transmitter/receiver for communicating with the network of seismic acquisition units 12, a power source, a local clock and a processor. In one embodiment, concentrator 20 functions simply as an intermediate long range receiver/transmitter to relay short range transmissions from the network of seismic units 12 to the control station 16. In another embodiment, concentrator 20 is provided with mass memory for storage of seismic data transmitted from the network of seismic units 12. In either embodiment, concentrator 20 may relay control signals and other transmission from the control station 16 back to the network of seismic units 12. In this same vein, concentrator 20 may be disposed to function as a local control station for a network of seismic units 12. While the preferred embodiment utilizes radio frequency for transmissions between concentrator 20 and control station 16, transmissions therebetween may also occur through various other transmission vehicles, such as telemetry cable or optic cable.

While certain features and embodiments of the invention have been described in detail herein, it will be readily understood that the invention encompasses all modifications and enhancements within the scope and spirit of the following claims.

What is claimed is:
1. A seismic data transmission system, comprising:
a plurality of seismic data acquisition units that acquire and transmit seismic data from an acoustic signal that propagates into earth and is reflected by subsurface lithologic formations or fluid layers of the earth, each of the plurality of seismic data acquisition units comprising:
a transmitter;
a receiver;
a local clock;
a local memory; and
a processor;
the system further comprising:
a geophone associated with each of the plurality of seismic data acquisition units;
a plurality of concentrators, each of the plurality of concentrators comprising a transmitter, a receiver, mass memory, a local clock, and a processor;
each of the plurality of seismic data acquisition units in wireless transmission and reception communication with at least two other of the plurality of seismic data acquisition units;
each of the plurality of concentrators in a transmission range of at least one of the plurality of seismic data acquisition units; and
wherein one of the plurality of concentrators acquires at least a portion of the seismic data from one of the at least two of the plurality of seismic data acquisition units via short range wireless communication via:
a first short range wireless transmission, in a time period, with a first transmission parameter, of at least a first portion of the seismic data between a first of the plurality of seismic data acquisition units and a second of the plurality of seismic data acquisition units;
a second short range wireless transmission, in the time period, with a second transmission parameter, of at least a second portion of the seismic data between a third of the plurality of seismic data acquisition units and a fourth of the plurality of seismic data acquisition units, wherein the third of the plurality of seismic data acquisition units and the fourth of the plurality of seismic data acquisition units are different data acquisition units than the first of the plurality of seismic data acquisition units and the second of the plurality of seismic data acquisition units; and the first transmission parameter and the second transmission parameter substantially prevent communication interference between the first short range wireless transmission and the second short range wireless transmission in the time period.

2. The seismic data transmission system of claim 1, comprising:
a control station;
a first of the plurality of concentrators connected to the control station by a data communications cable;
wherein the control station acquires at least a portion of the seismic data from the first of the plurality of concentrators via the data communication cable; and
wherein the control station provides command data to at least some of the plurality of seismic data acquisition units via wired communication from the control station to the first of the plurality of concentrators, and via wireless communication between the first of the plurality of concentrators and one of the plurality of seismic data acquisition units.

3. The seismic data transmission system of claim 2, comprising:
the control station disposed within a wireless transmission range of at least one of the plurality of seismic data acquisition units.

4. The seismic data transmission system of claim 1, comprising:
a first of the plurality of concentrators communicating with a control station via at least one of a telemetry cable and an optic cable to transmit the seismic data from the first of the plurality of concentrators to the control station and to transmit control data from the first of the plurality of concentrators to any of the plurality of seismic data acquisition units.

5. The seismic data transmission system of claim 1, comprising:
at least one of the plurality of concentrators relaying obtained short range transmissions of the seismic data from the plurality of seismic data acquisition units to a control station; and
the at least one of the plurality of concentrators relaying obtained command data from the control station to the plurality of seismic data acquisition units via short range transmission with at least the first of the plurality of seismic data acquisition units.

6. The seismic data transmission system of claim 5, wherein:
the first of the plurality of seismic data acquisition units relays the command data to the second of the plurality of seismic data acquisition units via short range transmission between the first of the plurality of seismic data acquisition units and the second of the plurality of seismic data acquisition units.

7. The seismic data transmission system of claim 1, comprising:
at least one of the plurality of concentrators including a local control station for a string of the plurality of seismic data acquisition units.

8. The seismic data transmission system of claim 7, wherein:
the mass memory of the at least one of the plurality of concentrators stores the seismic data for long term storage.

9. The seismic data transmission system of claim 1, comprising:
at least one of the plurality of seismic data acquisition units including an antenna attached to the at least one of the plurality of seismic data acquisition units via an external connector.

10. The seismic data transmission system of claim 1, comprising:
at least one of the plurality of seismic data acquisition units including a directional antenna.

11. The seismic data transmission system of claim 1, comprising:
at least one of the plurality of seismic data acquisition units having radio frequency identification capability.

12. The seismic data transmission system of claim 1, comprising:
at least one of the plurality of seismic data acquisition units having a bar code.

13. The seismic data transmission system of claim 1, comprising:
at least one of the plurality of seismic data acquisition units having an external projection that couples the least one of the plurality of seismic data acquisition units to the earth.

14. The seismic data transmission system of claim 1, comprising:
at least one of the plurality of seismic data acquisition units having an external projection comprising an electrically conductive conduit to charge a battery of the at least one of the plurality of seismic data acquisition units.

15. The seismic data transmission system of claim 1, comprising:
at least one of the plurality of seismic data acquisition units having an external projection comprising an electrically conductive conduit to charge a battery of the at least one of the plurality of seismic data acquisition units and that couples the at least one of the plurality of seismic data acquisition units to the earth.

16. The seismic data transmission system of claim 1, comprising:
at least one of the plurality of seismic data acquisition units having a plurality of external projections that couple the at least one of the plurality of seismic data acquisition units to the earth.

17. The seismic data transmission system of claim 16, wherein:
a first external projection of the plurality of external projections connects to a power source of the one of the plurality of seismic data acquisition units via a relay and a second external projection of the plurality of external projections controls the relay.

18. The seismic data transmission system of claim 17, comprising:
the relay in a closed position during charging of the power source and in an open position after charging of the power source.

19. The seismic data transmission system of claim 1, comprising:
a first spike, a second spike and a third spike that each couple at least one of the plurality of seismic data acquisition units to earth;
wherein the first spike and the second spike connect to a power source via a relay; and
the third spike operates to control the relay.

20. The seismic data transmission system of claim 1, comprising:
the geophone of at least one of the plurality of seismic data acquisition units externally attached to the least one of the plurality of seismic data acquisition units.

21. The seismic data transmission system of claim 1, wherein:
the receiver of at least one of the plurality of seismic data acquisition units operates to receive long range radio transmissions from at least one of the plurality of concentrators.

22. The seismic data transmission system of claim 1, comprising:
a battery coupled to each of the plurality of seismic data acquisition units.

23. The seismic data transmission system of claim 1, wherein:
the first of the plurality of seismic data acquisition units operates to communicate wirelessly with the second of the plurality of seismic data acquisition units via short range transmission in the absence of external cabling of the first of the plurality of seismic data acquisition units and in the absence of external unit control of the first of the plurality of seismic data acquisition units.

24. The seismic data transmission system of claim 1, wherein:
the mass memory of one of the plurality of concentrators operates to store at least a portion of the seismic data received from at least one of the plurality of seismic data acquisition units for long term storage.

25. The seismic data transmission system of claim 1, comprising:
a control station; and
wherein at least one of the plurality of concentrators communicates with the control station via one of a telemetry cable and an optic cable.

26. The seismic data transmission system of claim 1, wherein:
at least one of the plurality of concentrators relays control signals from a control station to at least one of the plurality of seismic data acquisition units via a telemetry cable between the at least one of the plurality of concentrators and the control station.

27. The seismic data transmission system of claim 1, wherein:
at least one of the plurality of concentrators relays control signals from a control station to at least one of the plurality of seismic data acquisition units via an optic cable between the at least one of the plurality of concentrators and the control station.

28. A seismic data transmission system, comprising:
a plurality of seismic data acquisition units that acquire and transmit seismic data from an acoustic signal that propagates into earth and is reflected by subsurface lithologic formations or fluid layers of the earth, the plurality of seismic data acquisition units in an array on the earth, the array formed by a plurality of lines of seismic data acquisition units, each of the plurality of seismic data acquisition units comprising:
a transmitter;
a receiver;
a local clock;
a local memory; and
a processor;
the system further comprising:
a geophone associated with each of the plurality of seismic data acquisition units;
a plurality of concentrators, each of the plurality of concentrators comprising a transmitter, a receiver, mass memory, a local clock, and a processor;
each of the plurality of seismic data acquisition units in wireless transmission and reception communication with at least two other of the plurality of seismic data acquisition units to transmit quality control data via a short range wireless communication to one of the plurality of concentrators;
each of the plurality of concentrators in a transmission range of at least one of the plurality of seismic data acquisition units; and
one of the plurality of concentrators acquires at least a portion of the seismic data from one of the at least two of the plurality of seismic data acquisition units via short range wireless communication, the seismic data including information related to the subsurface lithologic formations or fluid layers of the earth, the one of the plurality of concentrators acquires the portion of the seismic data via:
a first short range wireless transmission, in a time period, with a first transmission parameter, of at least a first portion of the seismic data between a first of the plurality of seismic data acquisition units and a second of the plurality of seismic data acquisition units;
a second short range wireless transmission, in the time period, with a second transmission parameter, of at least a second portion of the seismic data between a third of the plurality of seismic data acquisition units and a fourth of the plurality of seismic data acquisition units, wherein the third of the plurality of seismic data acquisition units and the fourth of the plurality of seismic data acquisition units are different data acquisition units than the first of the plurality of seismic data acquisition units and the second of the plurality of seismic data acquisition units; and
the first transmission parameter and the second transmission parameter substantially prevent communication interference between the first short range wireless transmission and the second short range wireless transmission in the time period.

29. A seismic data transmission system, comprising:
a plurality of seismic data acquisition units that obtain seismic data from an acoustic signal that propagates into earth and is reflected by subsurface lithologic formations or fluid layers of the earth, each of the plurality of seismic data acquisition units comprising:
a transmitter;
a receiver;
a local clock;
a local memory; and
a processor;
the system further comprising:
a geophone associated with each of the plurality of seismic data acquisition units;
the plurality of seismic data acquisition units in an array having multiple lines of sub-sets of the plurality of seismic data acquisition units;
a plurality of concentrators that are different types of devices than each of the plurality seismic data acquisition units, each of the plurality of concentrators comprising a transmitter, a receiver, mass memory, a local clock, and a processor;
a control station;
each of the plurality of seismic data acquisition units in wireless transmission and reception communication with at least one other of the plurality of seismic data acquisition units;
each of the plurality of concentrators in a transmission range of at least one of the plurality of seismic data acquisition units;

wherein one of the plurality of concentrators acquires at least a portion of the seismic data from at least one of the plurality of seismic data acquisition units via short range wireless communication; and the plurality of seismic data acquisition units include a first string of seismic data acquisition units and a second string of different seismic data acquisition units, the first string and the second string define a respective transmission path to the control station preset prior to operation of the seismic data transmission system, wherein the plurality of seismic data acquisition units transmit at least some of the seismic data to the control station via:

a first short range wireless transmission through the first string that defines a first transmission path, in a time period, with a first transmission parameter, of at least a first portion of the seismic data between a first of the plurality of seismic data acquisition units and a second of the plurality of seismic data acquisition units;

a second short range wireless transmission through the second string that defines a second transmission path, in the time period, with a second transmission parameter, of at least a second portion of the seismic data between a third of the plurality of seismic data acquisition units and a fourth of the plurality of seismic data acquisition units, wherein the third of the plurality of seismic data acquisition units and the fourth of the plurality of seismic data acquisition units are different data acquisition units than the first of the plurality of seismic data acquisition units and the second of the plurality of seismic data acquisition units;

the first transmission parameter and the second transmission parameter substantially prevent communication interference between the first short range wireless transmission and the second short range wireless transmission during the time period;

a third short range wireless transmission of at least the first portion of the seismic data between the second of the plurality of seismic data acquisition units and a first of the plurality of concentrators; and the first of the plurality of concentrators transmits at least the first portion of the seismic data to the control station via a data communications cable.

30. A seismic data transmission system, comprising:

a plurality of seismic data acquisition units that acquire and transmit seismic data from an acoustic signal that propagates into earth and is reflected by subsurface lithologic formations or fluid layers of the earth, each of the plurality of seismic data acquisition units comprising:
a transmitter;
a receiver;
a local clock;
a local memory; and
a processor;

the system further comprising:
a geophone associated with each of the plurality of seismic data acquisition units;
a plurality of concentrators, each of the plurality of concentrators comprising a transmitter, a receiver, mass memory, a local clock, and a processor;

each of the plurality of seismic data acquisition units in wireless transmission and reception communication with at least two other of the plurality of seismic data acquisition units;

each of the plurality of concentrators in a transmission range of at least one of the plurality of seismic data acquisition units;

wherein at least one of the plurality of concentrators relays control signals from a control station to at least one of the at plurality of seismic data acquisition units via a data communications cable between the at least one of the plurality of concentrators and the control station; and relays the seismic data from at least one of the plurality of seismic data acquisition units to the control station via the data communications cable; and a first of the plurality of concentrators acquires at least a portion of the seismic data from one of the at least two of the plurality of seismic data acquisition units via short range wireless communication; and wherein the plurality of seismic data acquisition units transmit the seismic data to the control station via at least two transmission paths preset prior to operation of the seismic data transmission system, the plurality of seismic data acquisition units transmit at least some of the seismic data to the control station via:

a first short range wireless transmission through a first transmission path, in a time period, with a first transmission parameter, of at least a first portion of the seismic data between a first of the plurality of seismic data acquisition units and a second of the plurality of seismic data acquisition units;

a second short range wireless transmission through a second transmission path, in the time period, with a second transmission parameter, of at least a second portion of the seismic data between a third of the plurality of seismic data acquisition units and a fourth of the plurality of seismic data acquisition units, wherein the third of the plurality of seismic data acquisition units and the fourth of the plurality of seismic data acquisition units are different data acquisition units than the first of the plurality of seismic data acquisition units and the second of the plurality of seismic data acquisition units;

wherein the first transmission parameter and the second transmission parameter substantially prevent communication interference between the first short range wireless transmission and the second short range wireless transmission during the time period; and a third short range wireless transmission of at least the first portion of the seismic data from the second of the plurality of seismic data acquisition units to the first of the plurality of concentrators; and the first of the plurality of concentrators transmits at least the first portion of the seismic data to the control station via the data communications cable.

* * * * *